(12) United States Patent
Gericke

(10) Patent No.: US 6,230,739 B1
(45) Date of Patent: May 15, 2001

(54) FUEL REFILLING ASSEMBLY

(75) Inventor: Michael Gericke, Schomberg (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 09/528,419

(22) Filed: Mar. 17, 2000

Related U.S. Application Data

(63) Continuation-in-part of application No. 09/307,374, filed on May 7, 1999, now abandoned.
(60) Provisional application No. 60/084,670, filed on May 7, 1998.

(51) Int. Cl.[7] .................................................. F16K 24/00
(52) U.S. Cl. ............................ 137/588; 137/629; 141/59; 141/302; 141/349
(58) Field of Search ................................ 137/588, 629; 141/59, 302, 304, 348, 349

(56) References Cited

U.S. PATENT DOCUMENTS

| | | | |
|---|---|---|---|
| 3,332,495 | * 7/1967 | Young ................................ 137/629 X |
| 4,651,889 | 3/1987 | Uranishi et al. . | |
| 4,715,509 | * 12/1987 | Ito et al. ............................. 141/59 X |
| 4,724,861 | * 2/1988 | Covert et al. ..................... 137/588 X |
| 4,747,508 | 5/1988 | Sherwood . | |
| 4,826,511 | 5/1989 | Harris . | |
| 4,874,020 | * 10/1989 | Bucci .................................... 141/59 |
| 4,932,444 | * 6/1990 | Micek ................................... 141/59 |
| 4,966,299 | * 10/1990 | Teets et al. ....................... 137/588 X |
| 5,186,220 | * 2/1993 | Scharrer ............................... 141/59 |
| 5,282,497 | * 2/1994 | Allison ................................. 141/59 |
| 5,320,147 | * 6/1994 | Jamrog ............................. 137/588 X |
| 5,404,906 | * 4/1995 | Aoshima et al. .................. 141/59 X |
| 5,439,129 | * 8/1995 | Buechler ........................... 141/59 X |
| 5,732,840 | * 3/1998 | Foltz ................................. 141/59 X |
| 6,029,719 | * 2/2000 | Hor et al. ........................ 137/588 X |
| 6,092,685 | * 7/2000 | Gruber ............................. 137/588 X |

* cited by examiner

Primary Examiner—John Rivell
(74) Attorney, Agent, or Firm—Howard & Howard

(57) ABSTRACT

A fuel refilling assembly for receiving a filling nozzle to open and close a filler neck of a fuel tank. The refilling assembly has a housing attached to the filler neck to receive the filling nozzle. A valve body is mounted to the housing and moves between seated and unseated positions to equalize the pressure within the filler neck, a filler pipe and the fuel tank. The refilling assembly is characterized by a first flap pivotally mounted to the housing and engaging the valve body for automatically moving the valve body from the seated position to the unseated position. The first flap is pivoted when the filling nozzle is partially inserted within the filler neck. Once the valve body is disengaged, any pressurized fuel vapors within the filler neck, filler pipe and fuel tank are vented to the atmosphere. The venting occurs before the filling nozzle opens the filler neck which ensures a safe filling operation.

29 Claims, 14 Drawing Sheets

FUEL REFILLING ASSEMBLY

RELATED APPLICATION

This patent application is a Continuation-in-Part of U.S. patent application Ser. No. 09/307,374, filed on May 7, 1999., now abandoned, which in turn claims priority to and all the benefits of United States Provisional Patent Application Ser. No. 60/084,670, filed on May 7, 1998.

TECHNICAL FIELD

The subject invention relates to a fuel refilling assembly for filling a fuel tank of an automotive vehicle.

BACKGROUND OF THE INVENTION

Vehicle fuel tanks generally include a filler neck extending from the tank to allow a user to refill the tank with liquid fuel. Some type of cap or cover is placed over the filler neck in order to seal the fuel tank from the atmosphere. Conventional gas cap assemblies are typically threaded onto the filler neck and include some type of locking handle. The typical function of a gas cap is to seal the fuel tank from outside impurities, such as dirt and dust, and to also maintain fuel vapor within the fuel tank. A predetermined pressure is usually maintained by a valve mechanism located within the cap. When the pressure within the fuel tank reaches a predetermined super-atmospheric level, the valve mechanism automatically opens to release the pressure. When the pressure within the fuel tank drops to a predetermined sub-atmospheric level, the valve mechanism opens to equalize the pressure.

Before the filling of the fuel tank a user completely removes the gas cap from the filler neck and then inserts a filling nozzle. The fuel tank is then filled to the desired level. As appreciated, pressure may build-up within the fuel tank but still be below the super-atmospheric level.

Many prior art refueling systems include a sealing flap door mounted within the filler neck. The filling nozzle opens the flap door when inserted into the filler neck. When the flap door is closed, the flap door seals the filler neck from the atmosphere and contains the built-up pressure within the fuel tank. Just before insertion of the filling nozzle, some fuel may drip or spill from the filling nozzle onto the flap door. This creates a potentially dangerous situation. Specifically, when the filling nozzle opens the flap door, the seal between the flap door and filler neck is broken which releases the built-up pressure in the fuel tank. This escaping vapor can spray the spilled fuel toward the user. Certain injury can result such as affixation, burning and scorching.

Accordingly, it is desirable to have a fuel refilling assembly which incorporates a fast pressure decay within the fuel filler neck and fuel tank prior to completely inserting the filling nozzle. Even more preferably, this pressure decay should automatically be triggered when the filling process is initiated by the user. In addition, the fuel refilling assembly may also incorporate a valve mechanism for automatically equalizing the pressure within the fuel tank.

SUMMARY OF THE INVENTION

A fuel refilling assembly for selectively receiving a filling nozzle to open and close a filler neck of a fuel tank. The refilling assembly comprises a housing adapted for attachment to the filler neck to selectively receive the filling nozzle. At least one sealing device is movably mounted to the housing to move between seated and unseated positions for selectively equalizing pressure within the filler neck. The refilling assembly is characterized by an actuator movably mounted to the housing and selectively engaging the sealing device for responsively moving the sealing device from the seated position to the unseated position when the filling nozzle is partially received within the filler neck, thereby venting any pressurized fluid from the filler neck before the filling nozzle opens the filler neck.

Accordingly, the subject invention provides a fuel refilling assembly having a valve mechanism for automatically equalizing the pressure within the fuel tank and incorporates a fast pressure decay within the fuel filler neck and fuel tank prior to completely inserting the filling nozzle. The pressure decay is automatically triggered when the filling nozzle engages the actuator, thereby providing an efficient system which is convenient to use.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
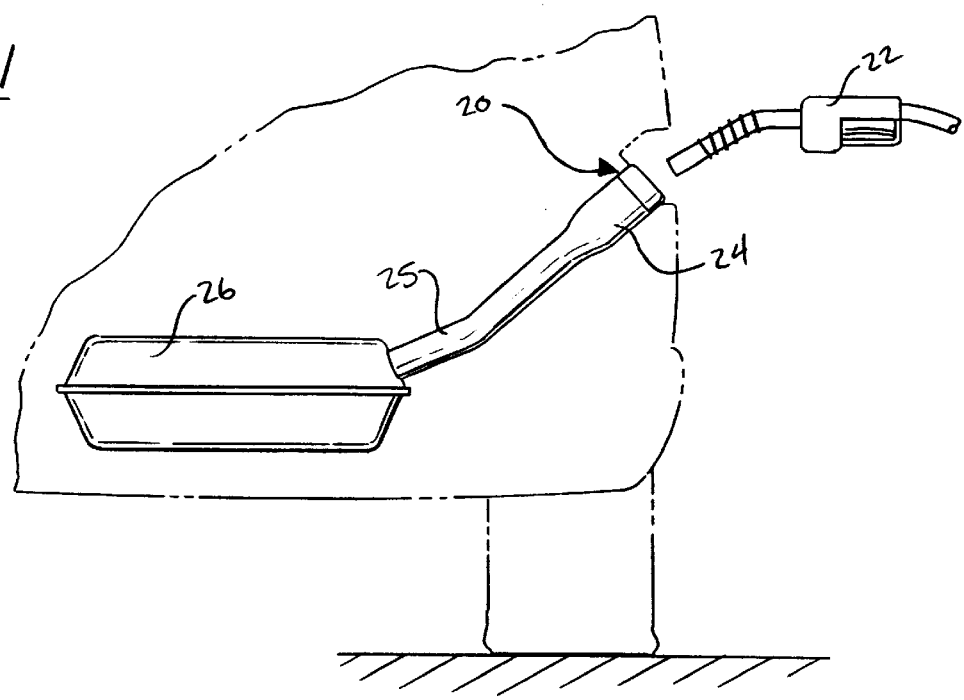
FIG. 1 is a side view of a vehicle fuel tank incorporating a fuel refilling assembly of the subject invention.
Figure 2:
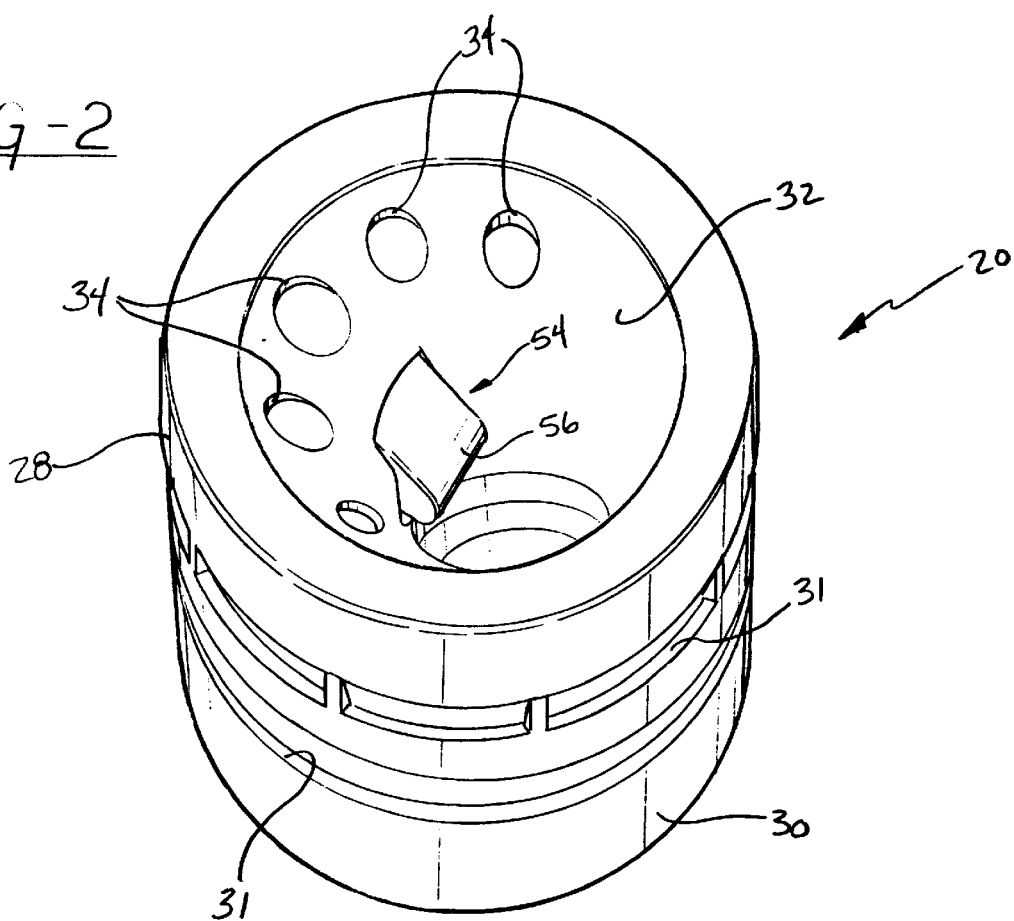
FIG. 2 is a perspective top view of the fuel refilling assembly removed from the fuel tank.
Figure 3:
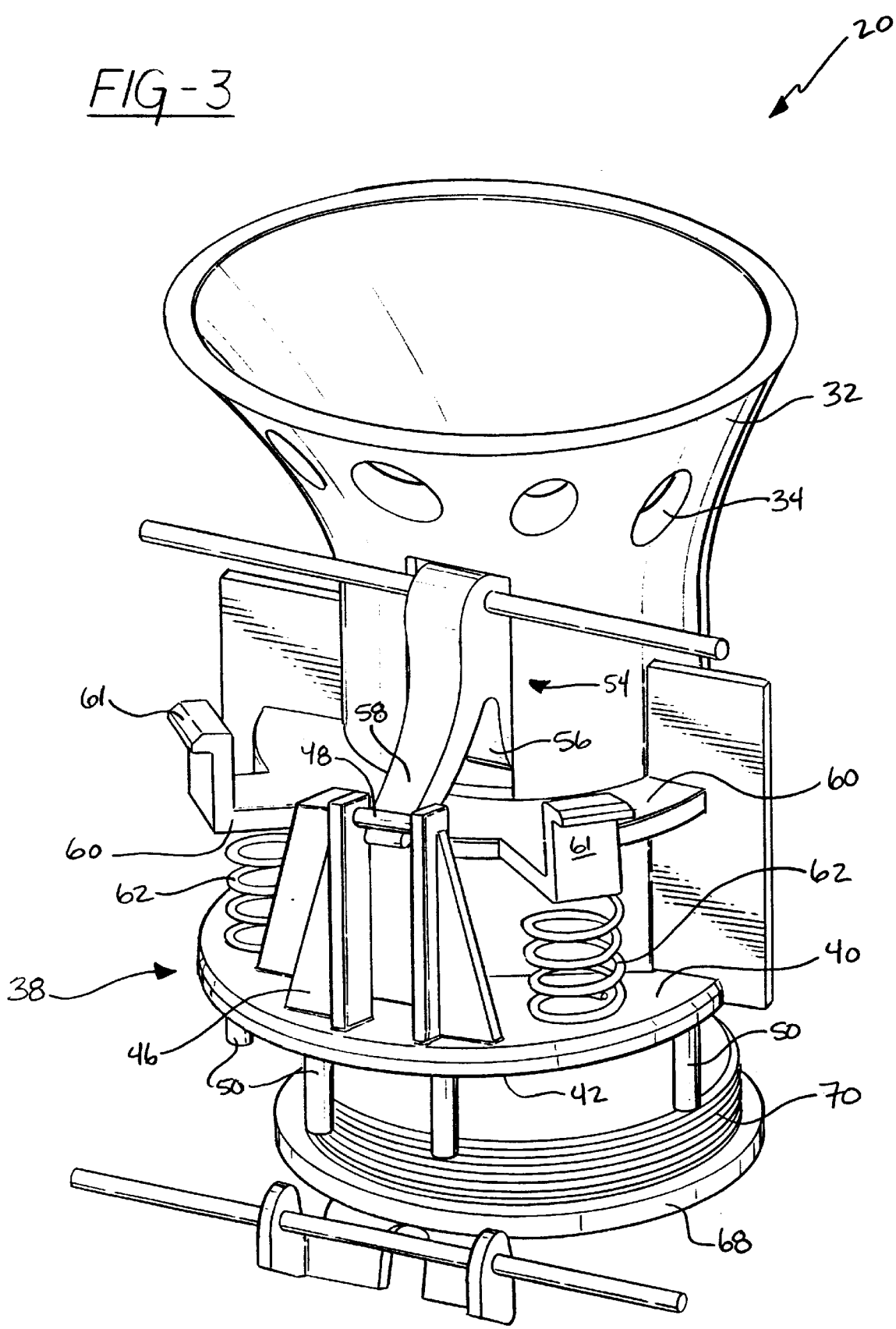
FIG. 3 is a perspective view of the fuel refilling assembly with an outer housing removed.

Referring to the Figures, wherein like numerals indicate like or corresponding parts throughout the several views, a fuel refilling assembly is generally shown at 20 in FIG. 1. The refilling assembly 20 selectively receives a filling nozzle 22 to open and close a filler neck 24 of a fuel tank 26. The filler neck 24 is actually an extension of a filler pipe 25 which extends directly from the fuel tank 26. The fuel tank 26, filler pipe 25 and filler neck 24 are shown generically within a vehicle 27 and may be of any conventional type as is known in the art.

Referring to FIGS. 2 through 5, the preferred embodiment of the refilling assembly 20 is shown in greater detail. The refilling assembly 20 comprises a housing 28, 30 adapted for attachment to the filler neck 24 to selectively receive the filling nozzle 22. The housing 28, 30 includes an upper portion 28 and a lower portion 30. The lower portion 30 is mounted within the filler neck 24 by any suitable means such as crimping, press fitting, locking fingers and/or a separable fastener. The lower portion 30 is snap fit into the upper portion 28 by a snap in feature (not numbered). The upper portion 28 may also be mounted to the filler neck 24. Both the upper 28 and lower 30 portions include integral grooves 31 formed in outer surface thereof. The grooves 31 preferably interlock with a crimped or bent portion (not shown) of the filler neck 24 to secure the housing 28, 30 to the filler neck 24.

A funnel 32 is mounted to the upper portion 28 of the housing 28, 30 and at least partially extends into the lower portion 30. The funnel 32 includes a plurality of apertures 34 for venting fluid from the filler neck 24. It is appreciated that the fluid vented from the filler neck 24 is typically gaseous fuel vapors. The funnel 32, upper portion 28 and lower portion 30 provide a guide for receiving and guiding the filling nozzle 22 into the filler neck 24. The particular configuration of the funnel 32, and housing portions 28, 30 may be of any suitable design.

The upper portion 28 of the housing 28, 30 extends around a top lip of the filler neck 24. A cap 36 (shown in FIG. 4) is removably mounted to the top of the upper portion 28 for providing a protective cover for the filler neck 24 and fuel tank 26. The cap 36 is preferably of a simple design which does not necessarily seal against the upper portion 28 but keeps dust, dirt and other impurities from entering the filler neck 24 and fuel tank 26. The cap 36 has a cam lock (not shown) or is otherwise attached to the upper portion 28 of the housing 28, 30. As appreciated, the cap 36 may be of any suitable design or configuration without deviating from the scope of the subject invention.

At least one sealing device, generally shown at 38, is mounted to the housing 28, 30 and is moveable between seated and unseated positions for selectively equalizing any pressure within the filler neck 24. The sealing device 38 is further defined as a valve body 38 movably mounted to at least one of the upper 28 and lower 30 portions of the housing 28, 30.

As illustrated in the preferred embodiment, the sealing device 38 or valve body 38 operates as a pressure release valve to vent the fuel tank 26 when the fuel tank 26 is in a pressure condition and during the refilling of the fuel tank 26. The operation of the valve body 38 during these two conditions is discussed in greater detail below.

Figure 4:
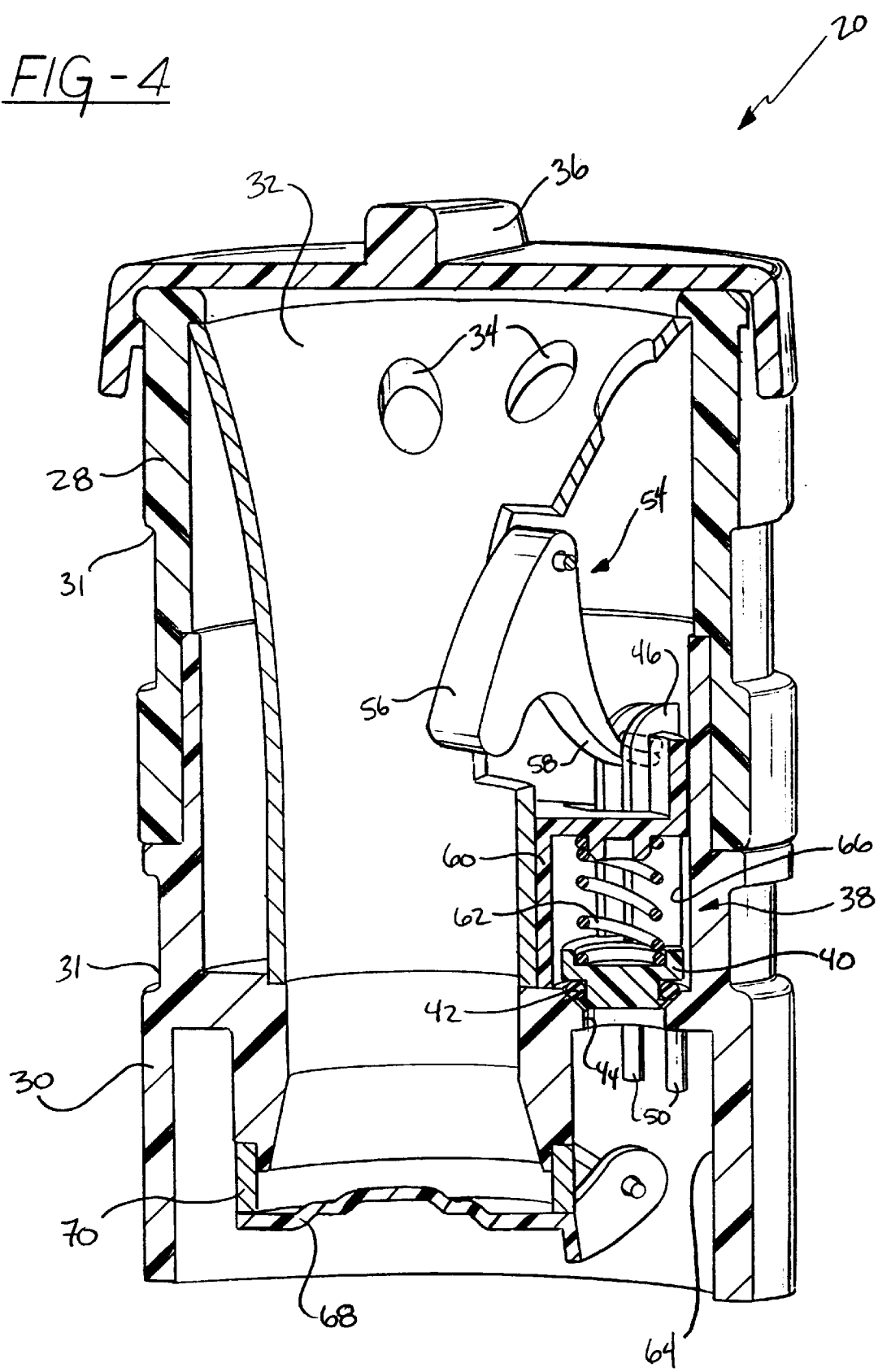
FIG. 4 is a cross-sectional perspective view of the fuel refilling assembly in a completely closed condition.

The preferred configuration of the valve body 38 includes a plate 40 for seating against the housing 28, 30. A valve gasket 42 is mounted to the plate 40. The lower portion 30 of the housing 28, 30 includes a sealing seat 44 with the plate 40 of the valve body 38 engaging the seat 44 when the valve body 38 is in the seated position. The seat 44 is best shown in FIG. 4. In particular, the gasket 42 seals against the seat 44 when in the seated position.

The valve body 38 further includes an upwardly extending frame 46 having a cross member 48. The frame 46 extends from the plate 40 in a direction opposite the gasket 42.

Figure 5:
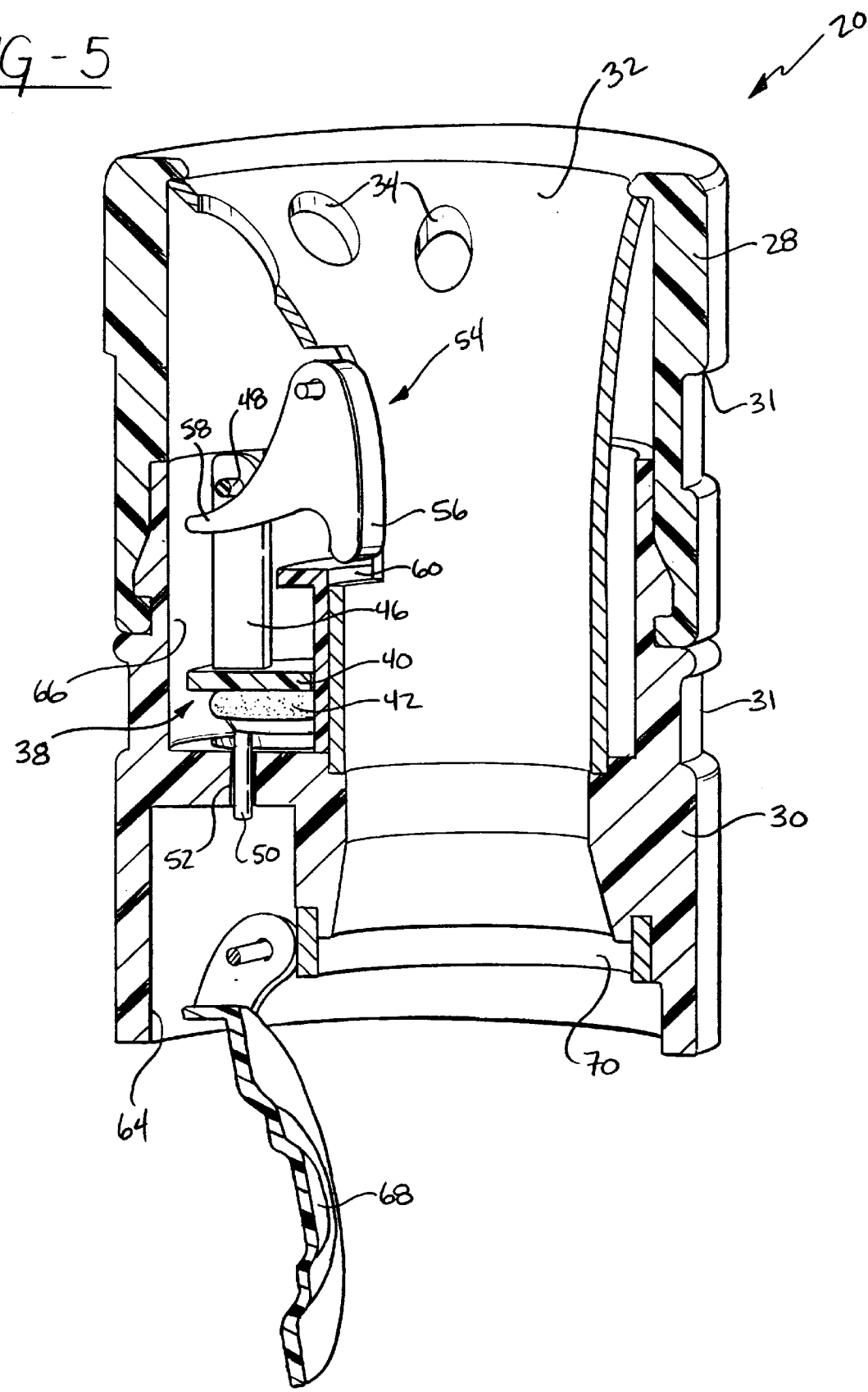
FIG. 5 is another cross-sectional perspective view of the fuel refilling assembly in a fully open condition.

At least one guide 50 also extends from the valve body 38. Preferably, the guide 50 extends downwardly from the plate 40 in an opposite direction from the frame 46. At least one aperture 52 is formed within one of the upper 28 and lower 30 portions of the housing 28, 30 as best shown in FIG. 5. The aperture 52 receives the guide 50 to orient the valve body 38 relative to the housing 28, 30 during the movement of the valve body 38 between the seated and unseated positions. Preferably there are four circular guides 50 which slide within four corresponding circular apertures 52 within the lower portion 30 of the housing 28, 30. The exact configuration of the valve body 38 may be modified without deviating from the overall scope of the subject invention. In fact, two such deviations are illustrated in the alternative embodiments which are discussed below.

The refilling assembly 20 is characterized by an actuator, generally shown at 54, movably mounted to the housing 28, 30 and selectively engaging the sealing device 38 for responsively moving the sealing device 38 from the seated position to the unseated position when the filling nozzle 22 is partially received within the filler neck 24, thereby venting any pressurized fluid from the filler neck 24 before the filling nozzle 22 opens the filler neck 24. The actuator 54 therefore lifts the valve body 38 regardless of the pressure within the fuel tank 26 to ensure a complete release of pressure. The release of pressure is preferably vented out to the atmosphere as will be discussed below.

The actuator 54 is preferably a first flap 56 pivotally connected to the housing 28, 30 and positioned to selectively engage the filling nozzle 22. The first flap 56 extends partially into the funnel 32 such that the first flap 56 may align with the filling nozzle 22 once the nozzle 22 is inserted. Preferably, there is an opening formed with the funnel 32 with the first flap 56 extending through the opening.

The actuator 54 also includes a projecting finger 58 extending from the flap 56 for engaging the cross member 48 of the frame 46. The finger 58 of the actuator 54 therefore responsively moves the valve body 38 from the seated position to the unseated position when the filling nozzle 22 engages the first flap 56. In other words, the actuator 54 is preferably coupled to the valve body 38 by the interconnection of the finger 58 to the frame 46.

A retainer 60 is mounted to at least one of the upper 28 and lower 30 portions of the housing 28, 30 and is disposed between the upper 28 and lower 30 portions adjacent the valve body 38. Preferably, the retainer 60 spans between the funnel 32 and the lower portion 30 of the housing 28, 30 and is interlocked to the lower portion 30 by a pair of tabs 61 (shown best in FIG. 3).

At least one biasing device 62 is mounted between the retainer 60 and the valve body 38 to continuously bias the valve body 38 toward the seated position with the plate 40 engaging the seat 44. There are preferably two biasing devices 62 which are illustrated as springs. The retainer 60 is utilized to hold the springs into position against the valve body 38.

As illustrated in FIGS. 4 and 5, the lower portion 30 of the housing 28, 30 defines a vent passageway 64 for providing fluid communication between the valve body 38 and the fuel tank 26. The housing 28, 30 further defines a chamber 66 disposed above the vent passageway 64 for providing fluid communication between the fuel tank 26 and the upper portion 28 of the housing 28, 30. When the valve body 38 is in the seated position, the chamber 66 is sealed from the vent passageway 64. Conversely, when the valve body 38 is in the unseated position, the chamber 66 is in fluid communication with the vent passageway 64.

A second flap 68 is pivotally connected to the housing 28, 30 and disposed below the first flap 56. In other words, the second flap 68 is positioned to engage the filling nozzle 22 after the filling nozzle 22 engages the first flap 56. A flap gasket 70 is mounted to a distal end of the housing 28, 30 and is engaged by the second flap 68 for sealing a portion of the housing 28, 30 from the filler neck 24 of the fuel tank 26. The flap gasket 70 is shown detached from the housing 28, 30 in FIG. 3 and secured to the housing 28, 30 in FIGS. 4 and 5.

Preferably, the second flap 68 is mounted to the lower portion 30 and seals off the lower portion 30 and funnel 32. A biasing device such as springs (not shown) are preferably mounted about a pivot point of the second flap 68 for continuously biasing the second flap 68 against the flap gasket 70. The biasing device preferably has one end pressing against the housing 28, 30 and another end pressing against the second flap 68. It is appreciated that in order to maintain a proper seal between the gasket 70 and the second flap 68, the biasing device should not engage the gasket 70. It should also be appreciated that the biasing device may be a torsion bar, flexible bar, U-shaped piece of spring steel or the like. The second flap 68 primarily seals the housing portions 28, 30 and funnel 32 from the filler pipe 25 and prevents any fuel vapor from escaping out the filler neck 24.

The operation of the valve body 38 as a pressure release valve when the fuel tank 26 is in a pressure condition is now discussed. The valve body 38 is in direct fluid communication with the vent passageway 64 such that the plate 40 is in direct contact with the pressure exerted from the filler pipe 25.

As discussed in the background section, during normal operating conditions, a predetermined pressure is to be maintained within the fuel tank 26 by the valve body 38. When the pressure within the fuel tank 26 reaches a predetermined super-atmospheric level, i.e., a pressure condition, the valve body 38 automatically opens to release the pressure. Preferably, the predetermined super-atmospheric level is between 15 and 17 kilo Pascal (kPa). In other words, when the pressure within the fuel tank 26 reaches 15 kPa the valve body 38 will begin to open. When the pressure reaches 17 kPa the valve body 38 will be opened entirely. Accordingly, the biasing device 62 must have a biasing force which equates to holding the plate 40 and gasket 42 against the seat 44 up to the 15 kPa. Once the pressure within the filler neck 24 achieves 15 kPa, the plate 40 and gasket 42 will lift upward against the biasing force of the biasing devices 62 to open the fluid passageway between the vent passageway 64, the chamber 66 and the atmosphere. The valve body 38, retainer 60 and first flap 56, which are disposed within the chamber 66, are designed and configured to provide fluid communication through the chamber 66.

Once the pressure within the fuel tank 26 has returned to a normal operating condition, the biasing devices 62 bias the plate 40 and gasket 42 back into sealing engagement with the seat 44 on the lower portion 30 of the housing 28, 30.

Figure 6:
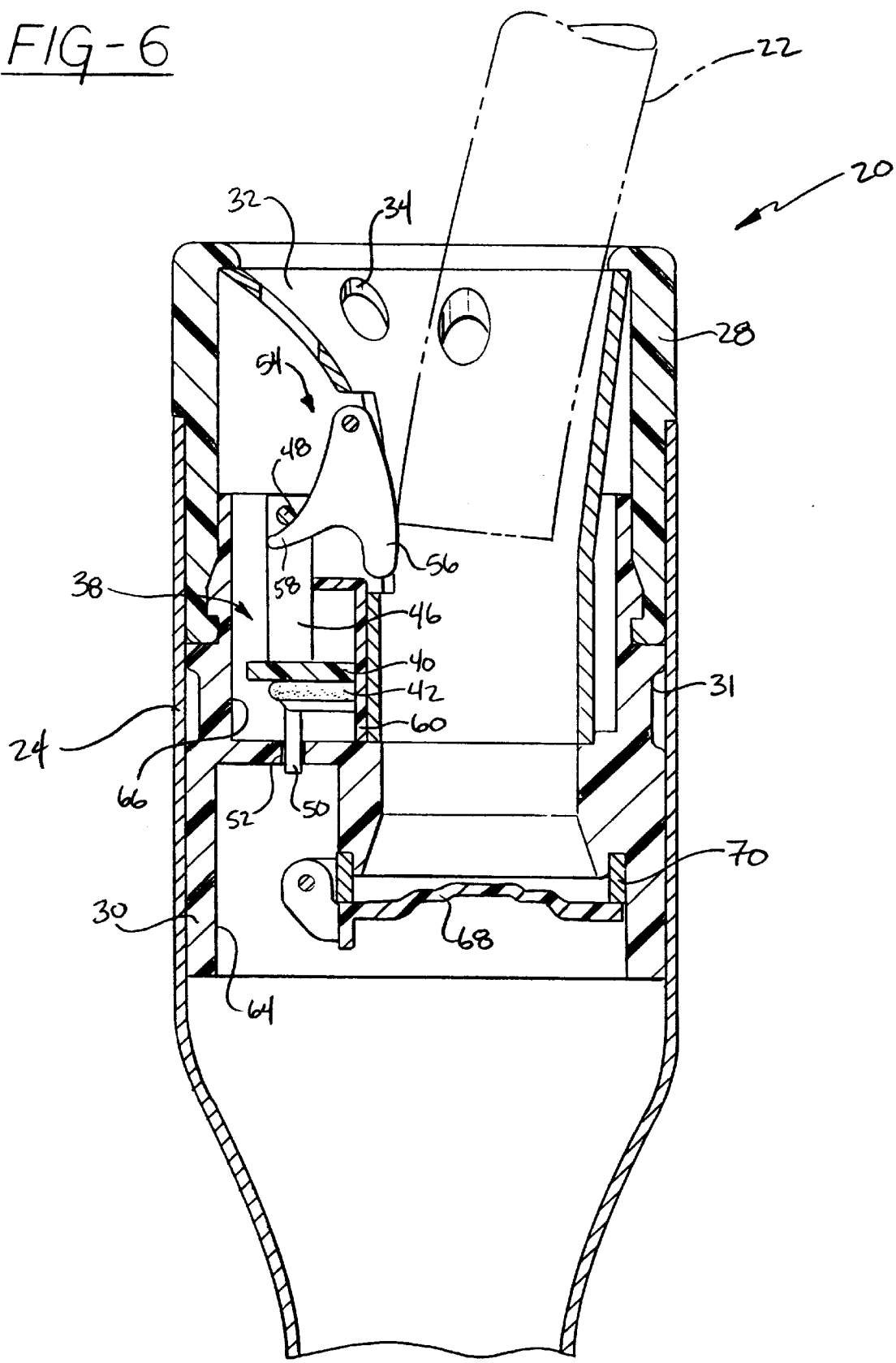
FIG. 6 is a cross-sectional side view of the fuel refilling assembly in a partially open condition with a filling nozzle partially inserted therein.
Figure 7:
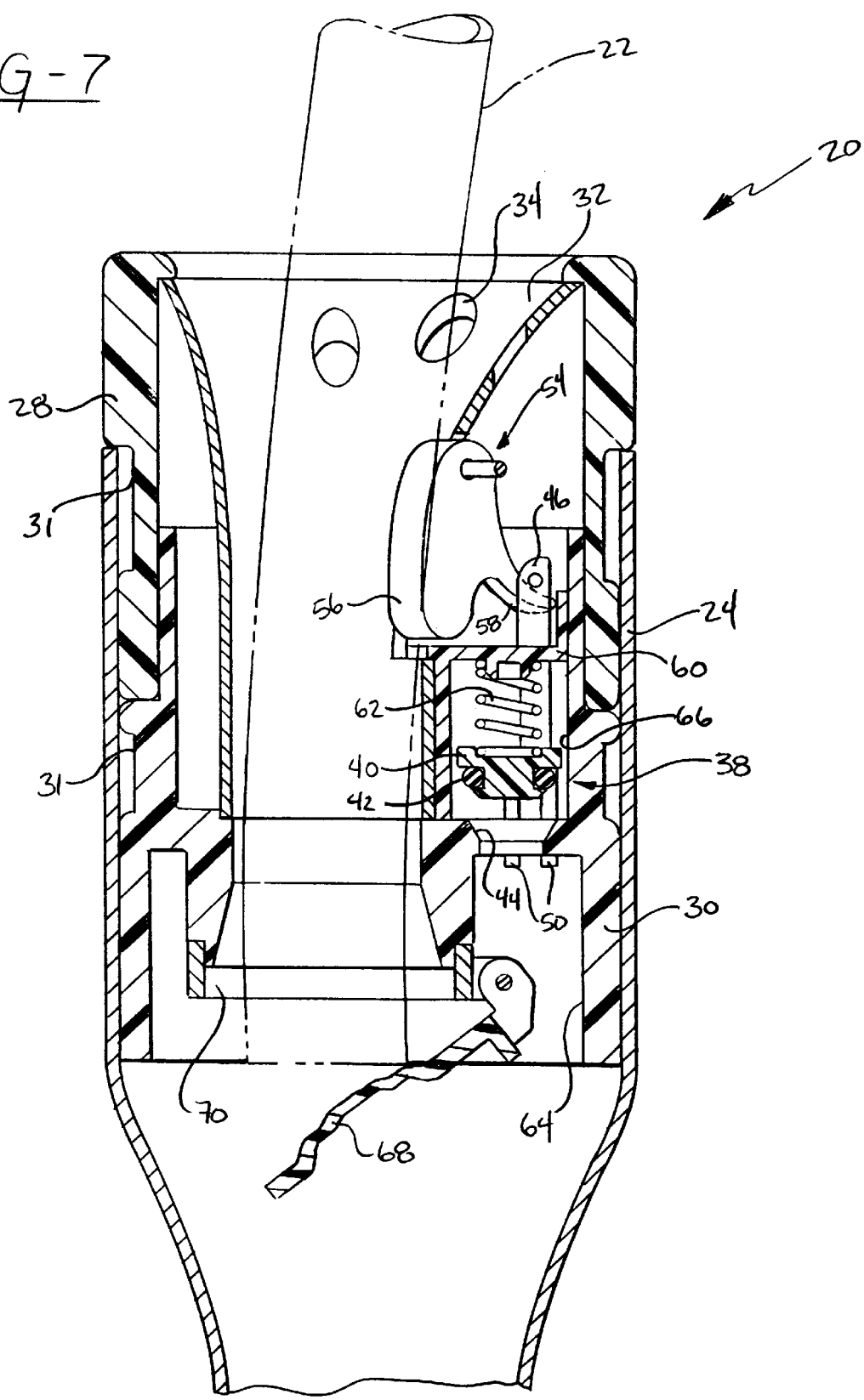
FIG. 7 is a cross-sectional side view of the fuel refilling assembly in a fully open condition with the filling nozzle inserted further.

Referring to FIGS. 6 and 7, the operation of the valve body 38 during the refilling of the fuel tank 26 is now discussed. The filling nozzle 22 is inserted into the funnel 32 and engages the actuator 54. More specifically, the nozzle 22 pivots the first flap 56 as shown in FIG. 6. The pivoting of the first flap 56 in turn pivots the finger 58. The finger 58 engages the cross member 48 of the frame 46 to lift the valve body 38 upwardly. The upward lifting force of the finger 58 is sufficient to overcome the biasing force of the biasing devices 62. The valve gasket 42 is therefore unseated from the seat 44 to a position above the seat 44 for venting the filler neck 24, filler pipe 25 and fuel tank 26 before the filling nozzle 22 opens the filler neck 24.

The ventilating of the filler neck 24 is specifically achieved by creating a fluid passageway between the filler neck 24, vent passageway 64, chamber 66 and the atmosphere via the unsealing of the plate 40. During the release of pressure within the fuel tank 26, the vapors escape through the vent passageway 64, around the valve body 38, up into the chamber 66 and out through the apertures 34 in the funnel 32. Any built up pressure in the filler neck 24, filler pipe 25 and fuel tank 26 is therefore released.

This complete release of pressure is a safety measure which combats the deficiencies associated with the prior art designs discussed in the background section. As appreciated, the fuel tank 26 may be pressurized to almost 15 kPa and the valve body 38 will not automatically release this pressure. This built-up pressure within the fuel tank 26 necessitates the need for the subject invention.

The filling nozzle 22 then hits the second flap 68 which urges the second flap 68 out of engagement with the flap gasket 70 as shown in FIG. 7. Since the pressure is released, there is no danger of splashing fuel and/or fuel vapors injuring the user. The filling nozzle 22 can now be completely inserted within the housing 28, 30 and the refilling of the fuel tank can begin.

A liquid seal between the filling nozzle 22 and the filler pipe 25 is created during the refueling. A mechanical seal (not shown) may also be used between the filling nozzle 22 and filler pipe 25 to create this seal. The liquid seal prevents any displaced fuel vapors from venting into the atmosphere. Preferably, the fuel vapors will vent through an environmentally safe container such as a carbon canister (not shown).

Referring to FIGS. 8 through 12, an alternative embodiment of the subject invention is shown wherein like numerals increased by one hundred indicate like or corresponding parts. The refilling assembly 120 comprises a housing 128, 130 including an upper portion 128 and a lower portion 130. The upper portion 128 is mounted within a filler neck 124 as is known in the art. The lower portion 130 is in turn snap fit into the upper portion 128 by an annular rib (not numbered).

A pair of truncated cones 172 are also press fit into the upper portion 128. The truncated cones 172, upper portion 128 and lower portion 130 provide a guide for receiving and guiding a filling nozzle into the filler neck 124. A cap 136 is removably mounted to the top of the upper portion 128 for providing a protective cover for the filler neck 124 and a fuel tank. Although not shown, the filling nozzle and fuel tank are similar to the nozzle 22 and tank 26 shown in FIG. 1.

At least one sealing device, generally shown at 138, is mounted to the housing 128, 130 and is moveable between seated and unseated positions for selectively equalizing any pressure within the filler neck 124. The sealing device 138 is further defined as a valve body 138 movably mounted to at least one of the upper 128 and lower 130 portions of the housing 128, 130.

In this alternative embodiment, the sealing device 138 or valve body 138 operates as a vacuum release valve for allowing atmospheric air to pass into the fuel tank when the fuel tank is in a vacuum condition. The vacuum condition occurs when the pressure within the fuel tank drops to a predetermined subatmospheric level. The valve body 138 of this embodiment also operates to vent the fuel tank during the refilling of the tank as will be discussed in greater detail below.

The configuration of this alternative valve body 138 includes a plate 140 for seating against the housing 128, 130. A post 174 extends downwardly from the plate 140. A valve gasket 142 is mounted to the lower portion 130 of the housing 128, 130 with the plate 140 of the valve body 138 selectively engaging the gasket 142 to seal the filler neck 124. The gasket 142 preferably has an annular configuration with a pair of apertures (not numbered). One aperture provides an opening for the post 174 and the other aperture extends over a tab 176 which secures the gasket 142 to the lower portion 130 of the housing 128, 130. A pair of springs 178 engaging the plate 140 for continuously biasing the plate 140 toward the engagement with the gasket 142.

The refilling assembly 120 is similarly characterized by an actuator, generally shown at 154, movably mounted to the housing 128, 130 and selectively engaging the sealing device 138 for responsively moving the sealing device 138 from the seated position to the unseated position when the filling nozzle is partially received within the filler neck 124, thereby venting any pressurized fluid from the filler neck 124 before the filling nozzle opens the filler neck 124. The actuator 154 therefore lifts the valve body 138 regardless of the pressure within the fuel tank to ensure a complete release of pressure.

The actuator 154 is preferably a first flap 156 pivotally connected to the housing 128, 130 for selective engagement with the filling nozzle. The first flap 156 extends partially into the lower portion 130 of the housing 128, 130.

Figure 8:
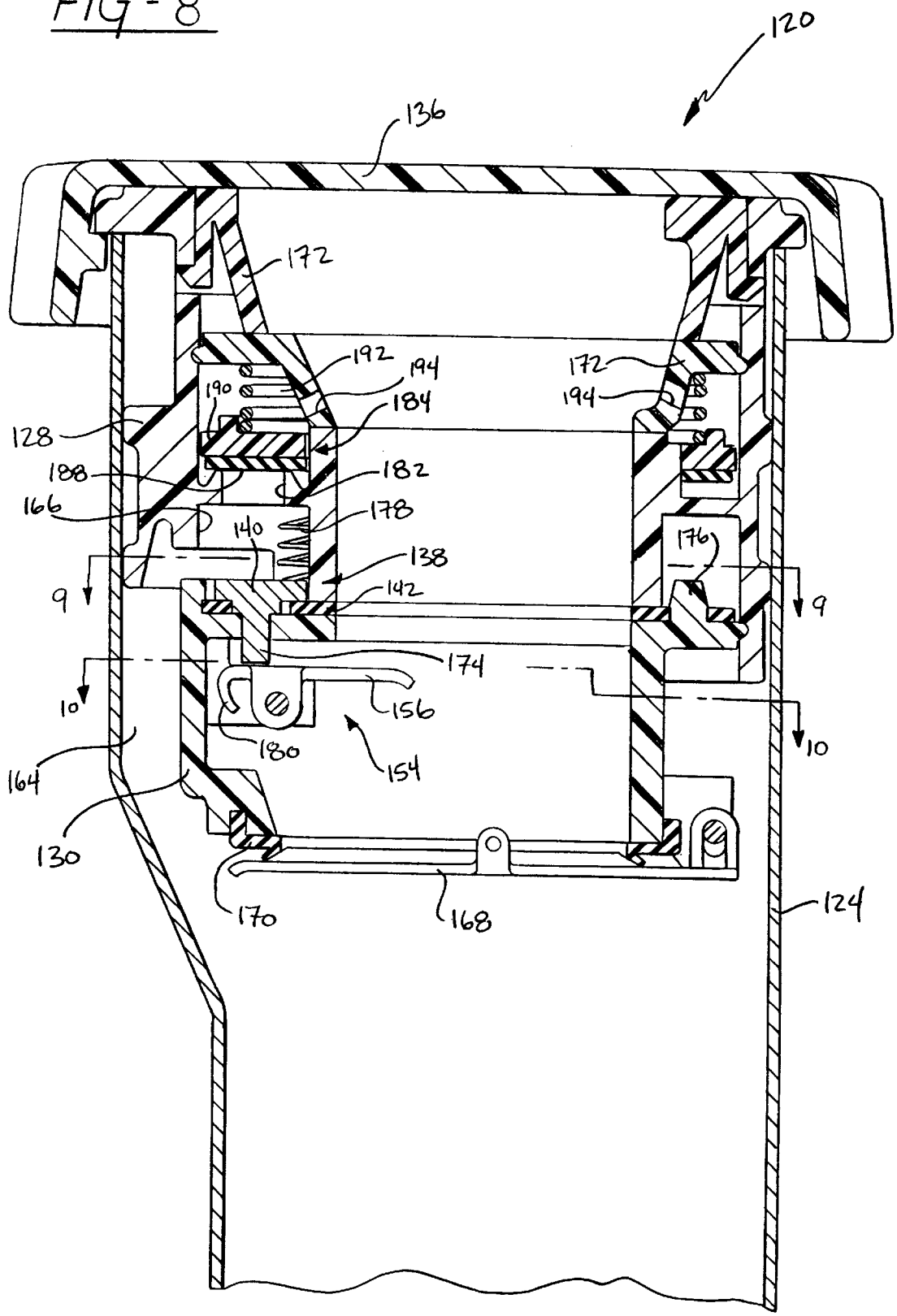
FIG. 8 is a partially cross-sectional side view of an alternative embodiment of the fuel refilling assembly.
Figure 9:
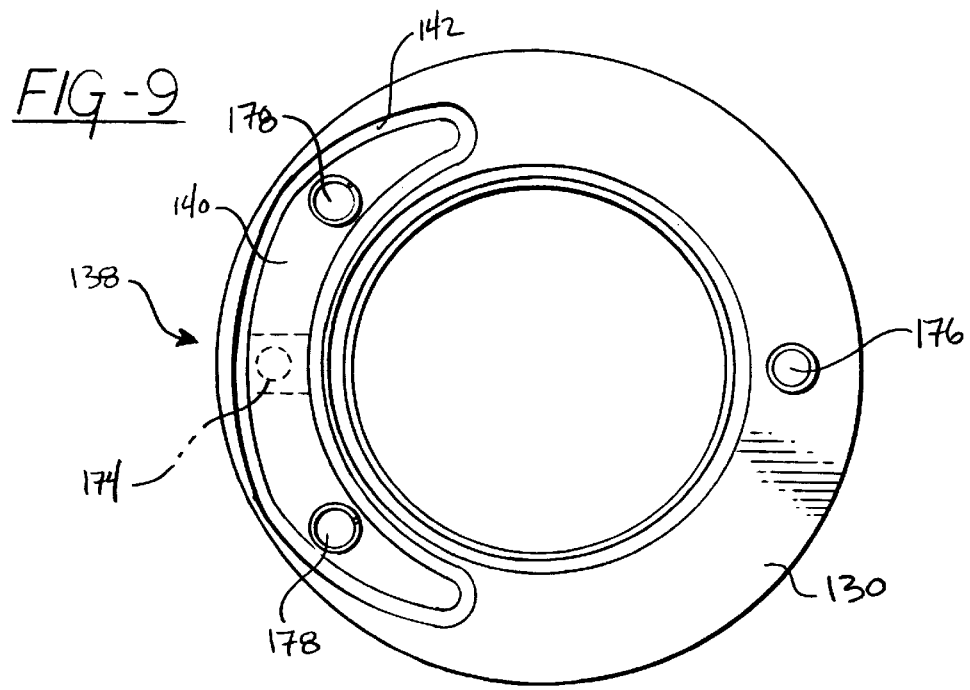
FIG. 9 is a top view taken along line 9—9 of FIG. 8.
Figure 10:
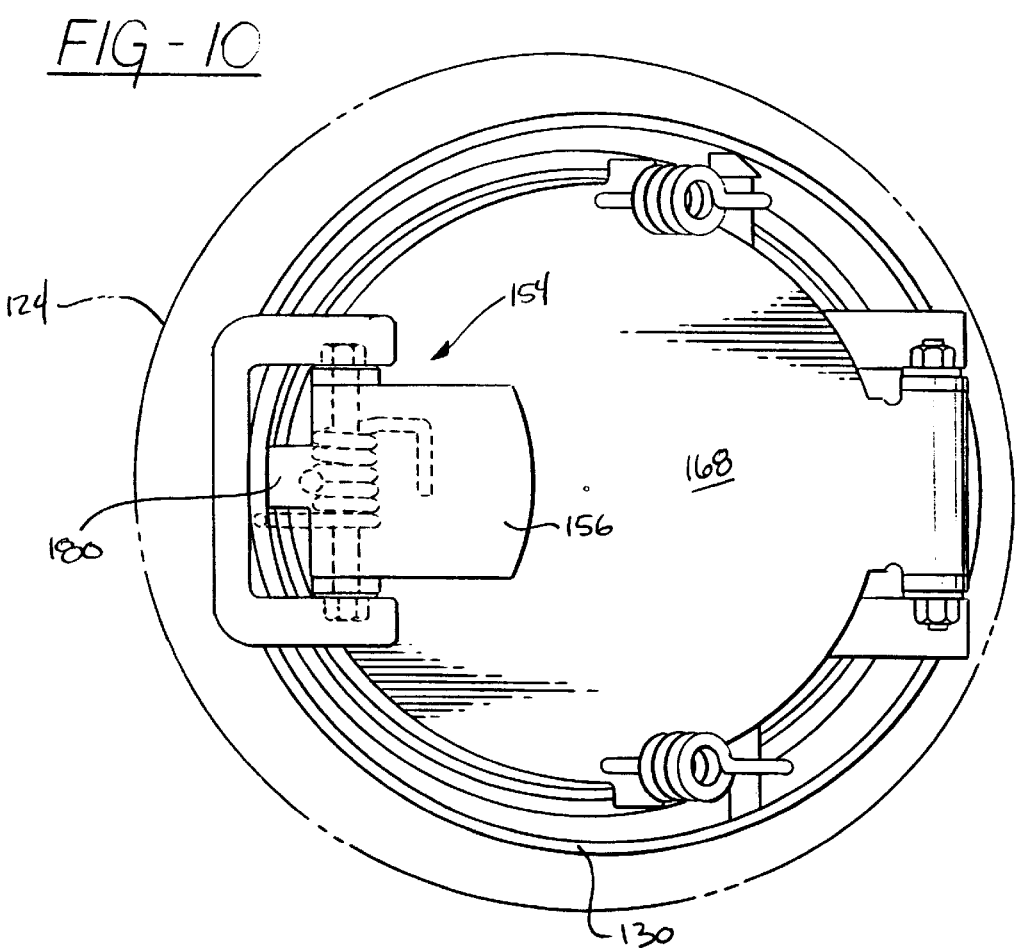
FIG. 10 is a top view taken along line 10—10 of FIG. 8.
Figure 11:
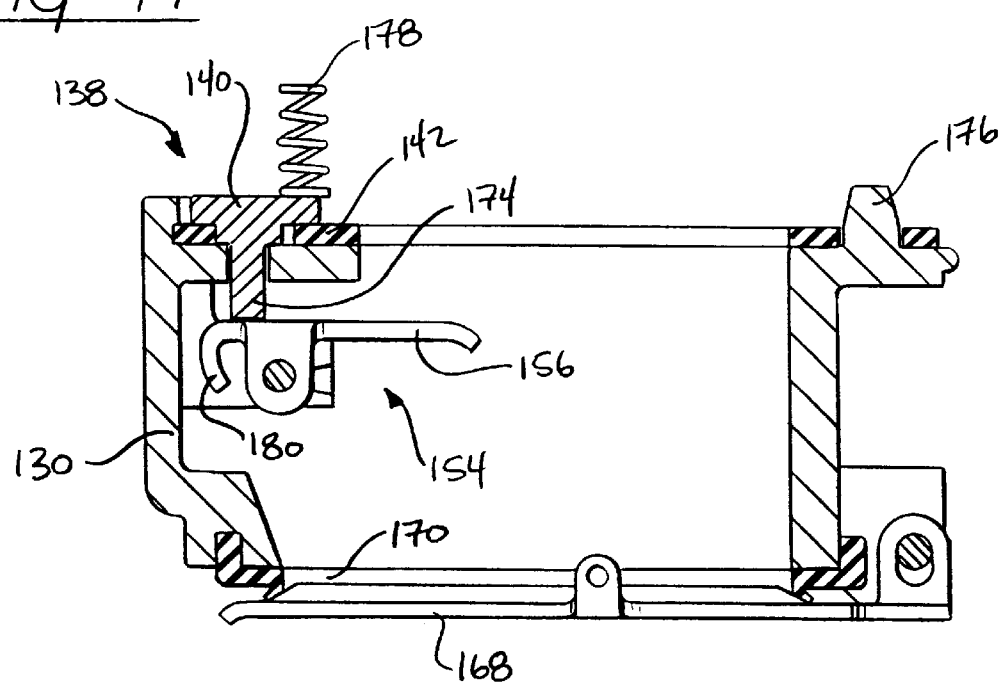
FIG. 11 is a partially cross-sectional side view of a lower portion of a housing taken from the embodiment of FIG. 8 illustrating a valve body and first and second flaps.
Figure 12:
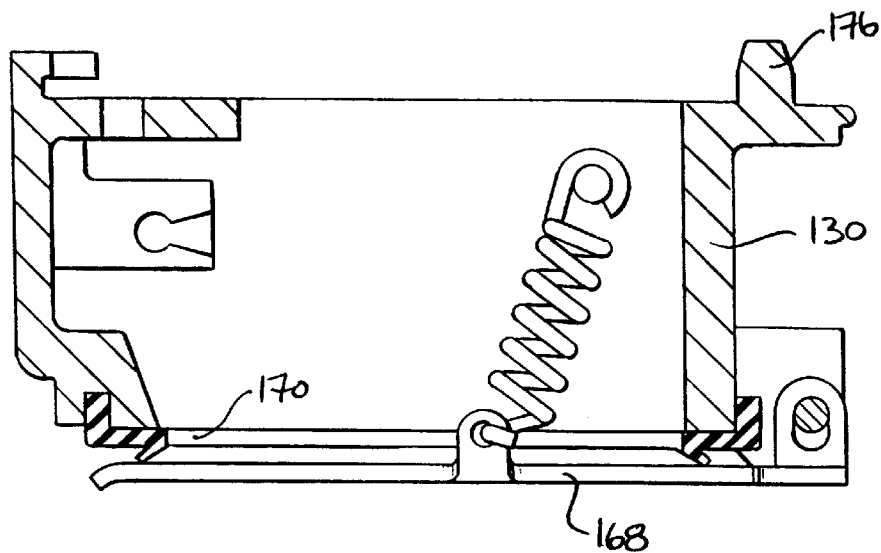
FIG. 12 is a partially cross-sectional side view of the lower portion of FIG. 11 with only the second flap.
Figure 13:
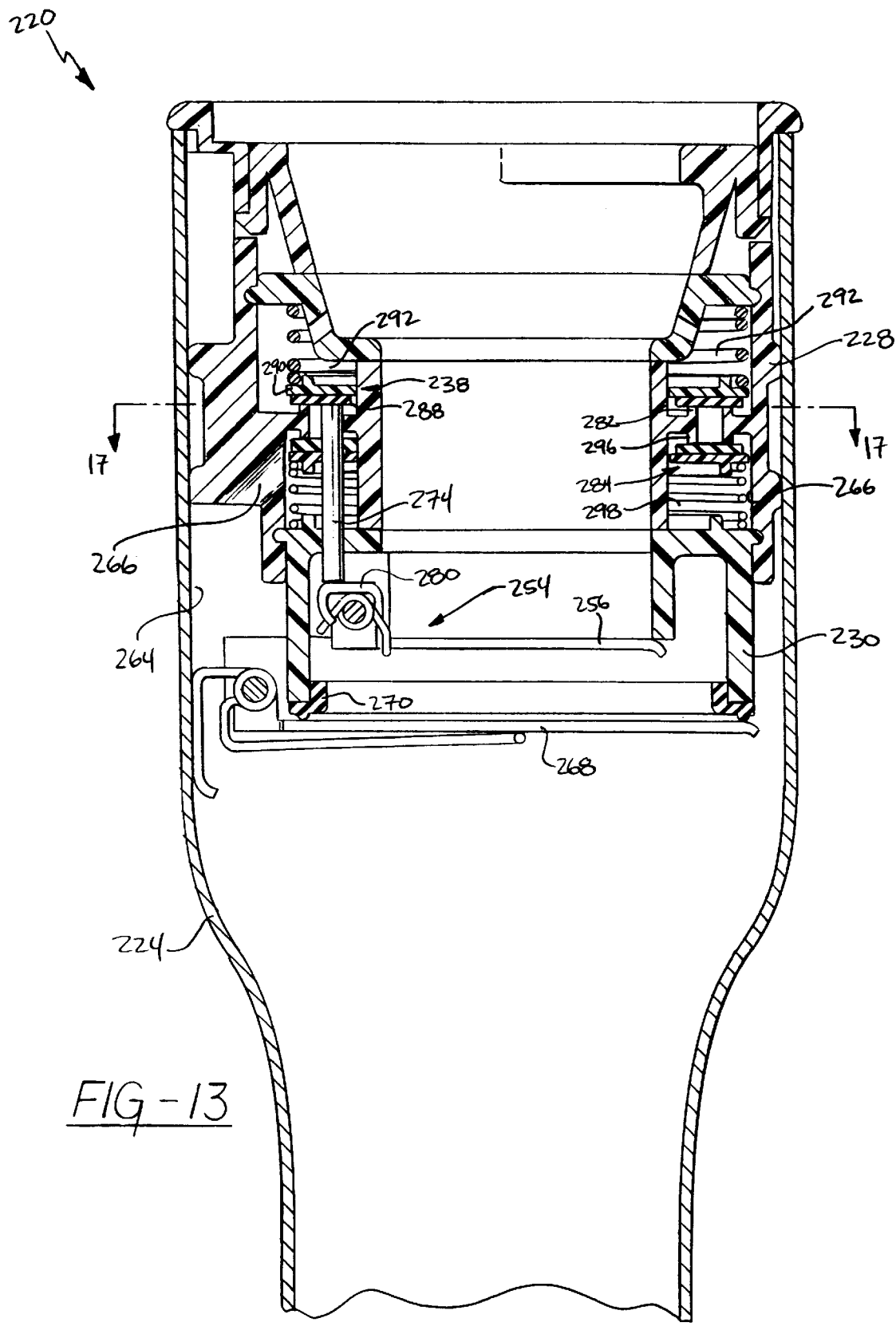
FIG. 13 is a side view of another alternative embodiment of the fuel refilling assembly in a completely closed condition.
Figure 14:
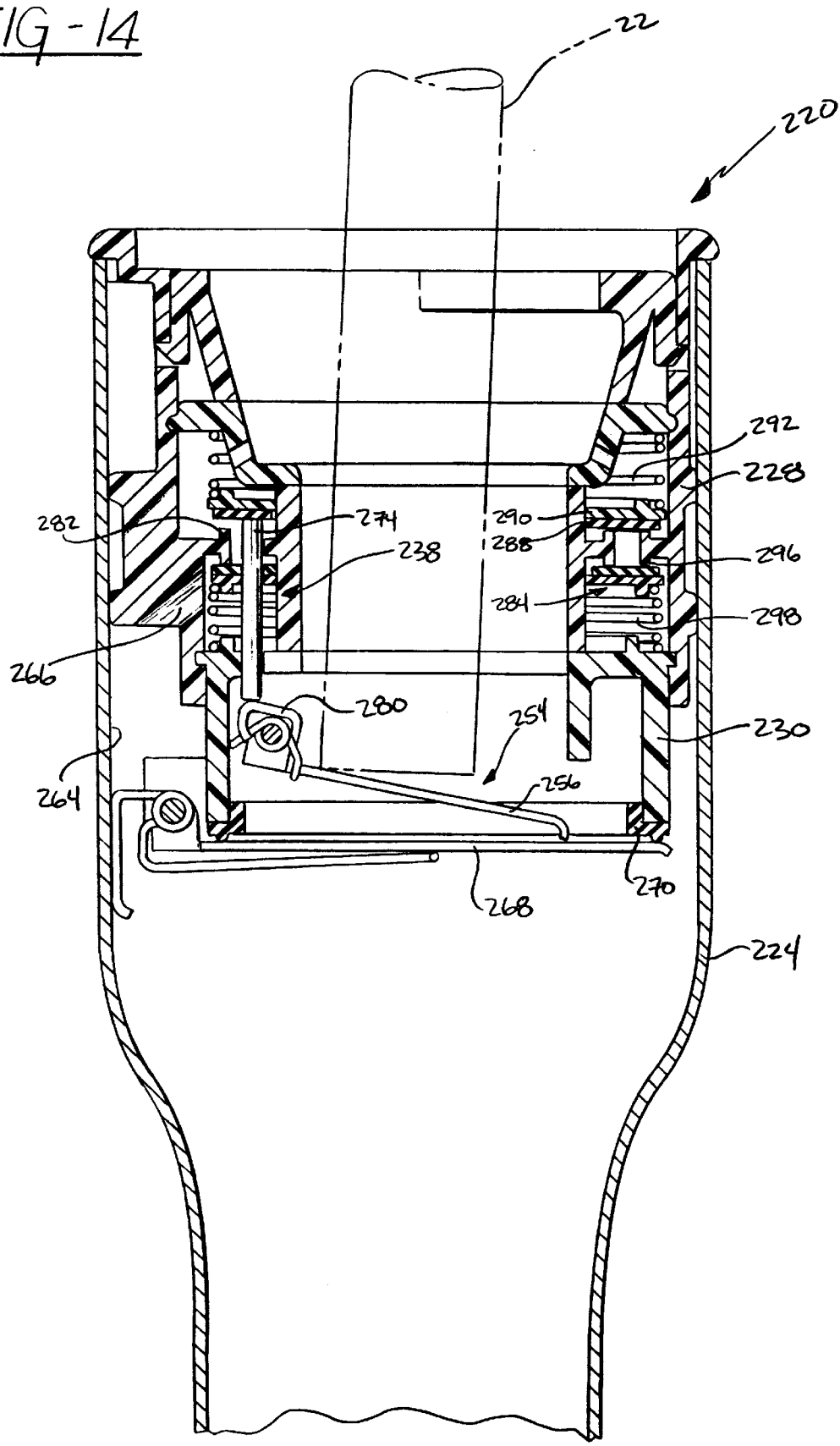
FIG. 14 is a side view of the alternative embodiment of FIG. 13 in a partially open condition.
Figure 15:
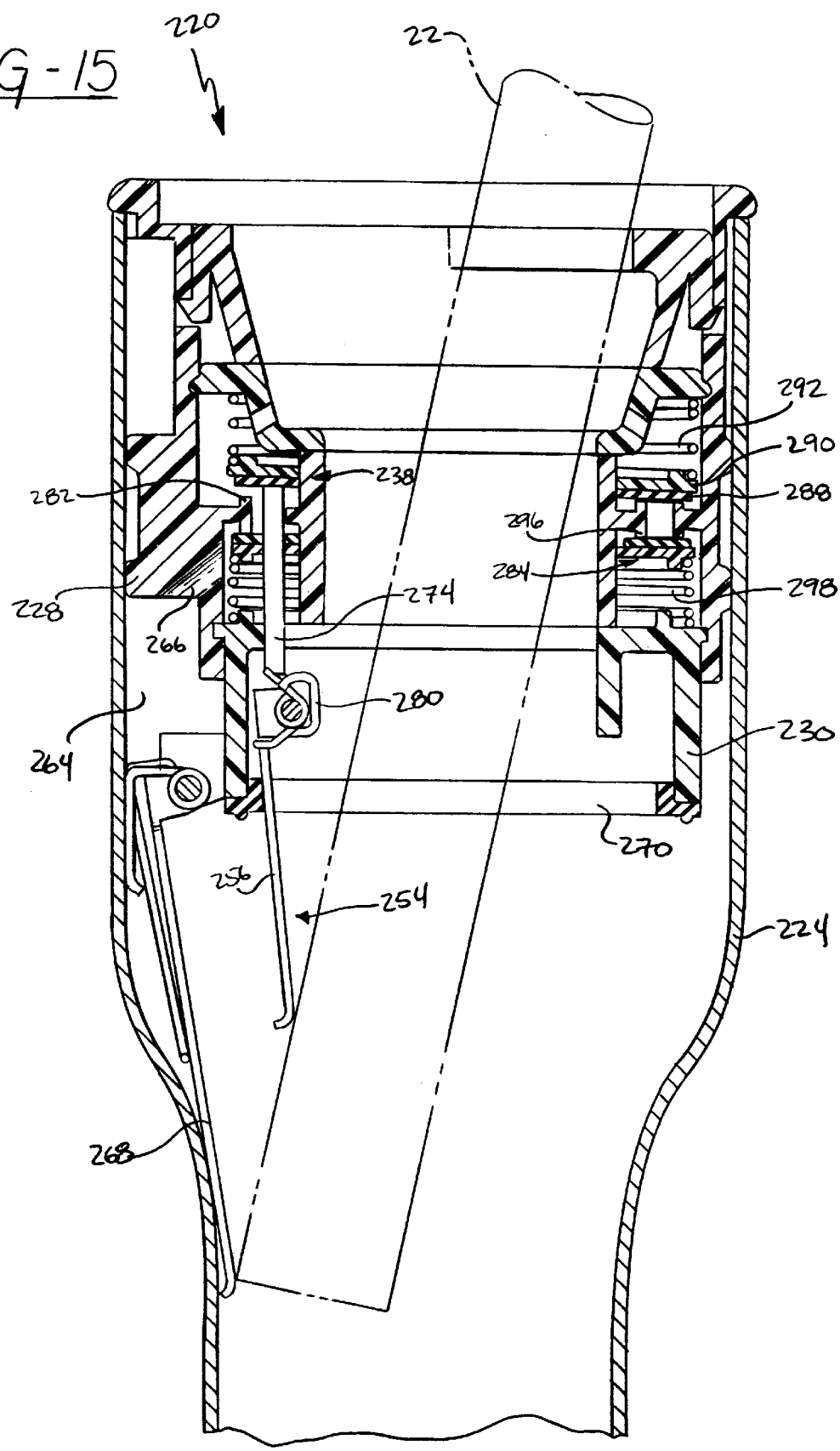
FIG. 15 is a side view of the alternative embodiment of FIG. 13 in a fully open condition.

As best shown in FIGS. 8, 10 and 11, the actuator 154 includes a cam 180 selectively engaging the valve body 138 for moving the valve body 138 to the unseated position when the filling nozzle engages the first flap 156. Specifically, the cam 180 selectively engages the post 174 to disengage the plate 140 from the gasket 142 to vent the filler neck 124 and fuel tank before the filling nozzle is fully inserted to open the filler neck 124. The cam 180 is preferably an integral part of the actuator 154.

A vent passageway 164 extends around the housing 128, 130 for providing fluid communication between the valve body 138 and the fuel tank. The housing 128, 130 also includes a chamber 166 disposed above the vent passageway 164 for providing fluid communication between the fuel tank and the valve body 138. Accordingly, pressure within the fuel tank and filler neck 124 is directly experienced by the valve body 138.

A second flap 168 is also pivotally connected to the housing 128, 130 and disposed below the first flap 156. In other words, the second flap 168 is positioned to engage the filling nozzle after the filling nozzle engages the first flap 156. A flap gasket 170 is mounted to a distal end of the housing 128, 130 and is engaged by the second flap 168 for sealing a portion of the housing 128, 130 from the filler neck 124 of the fuel tank. Preferably, the second flap 168 pivots in an opposite direction from the first flap 156 when the nozzle is inserted.

The upper portion 128 of the housing 128, 130 further includes an upwardly projecting pressure opening 182. A second valve body 184 selectively engages the pressure opening 182 to seal the filler neck 124. The second valve body 184 acts as a pressure release valve for the filler neck 124 in a similar fashion as the valve body 38 of the primary embodiment.

The pressure opening 182 is in fluid communication with the chamber 166 such that the second valve body 184 is in direct contact with the pressure exerted from the fuel tank.

The second valve body 184 includes a pressure gasket 188 mounted to a pressure plate 190. The second valve body 184 also includes an annular pressure spring 192 engaging the pressure plate 190 for continuously biasing the pressure gasket 188 against the pressure opening 182 of the housing 128, 130.

During the release of pressure within the fuel tank, the second valve body 184 will begin to lift from the pressure opening 182 and vent the pressure within the fuel tank at a predetermined level. Preferably, this predetermined level is 15 kPa, i.e., super-atmospheric pressure. There are a number of openings 194 within the truncated cones 172 to vent the super-atmospheric pressure from the chamber 166, filler neck 124 and fuel tank.

In accordance with the subject invention, pressure within the fuel tank is also released during the insertion of the filling nozzle. The filling nozzle first engages and pivots the first flap 156. The cam 180 extending from the first flap 156 engages the post 174 of the valve body 138 to lift the plate 140 from engagement with the gasket 142. The ventilating of the filler neck 124 is specifically achieved by opening a fluid passageway between the chamber 166 and the atmosphere via the unsealing of the gasket 142.

Referring now to FIGS. 13 through 19, a second alternative embodiment of the subject invention is shown wherein like numerals increased by 200 indicate like or corresponding parts throughout the several views. The fuel refilling assembly is generally shown at 220 in FIGS. 13, 14 and 15. As in the previous embodiments, the refilling assembly 220 includes a housing 228, 230 having upper 228 and lower 230 portions mounted within a filler neck 224 of a fuel tank (not specifically shown in these figures). An actuator, generally shown at 254, is provided as a first flap 256 and operates in substantially the same manner as above. However, the first flap 256 in this embodiment has a different shaped cam 280 and extends entirely across the lower portion 230 of the housing 228, 230. There is also a second flap 268 with a flap gasket 270 operating in substantially the same manner. Although the second flap 268 pivots in the same direction as the first flap 256. This alternative embodiment also has a vent passageway 264 and chamber 266 for creating a fluid passageway between the filler neck 224 and a sealing device, generally shown at 238.

As above, the sealing device 238 is further defined as a valve body 238. The valve body 238 of this alternative embodiment acts as a pressure release valve to release pressure within the fuel tank during both super-atmospheric and refilling conditions.

The valve body 238 includes a post 274 selectively engaging the cam 280 of the actuator 254 for moving the sealing device 238 to an unseated position. The valve body 238 includes a pressure gasket 288 mounted to a pressure plate 290. The valve body 238 also includes an annular pressure spring 292 engaging the pressure plate 290.

Figure 16:
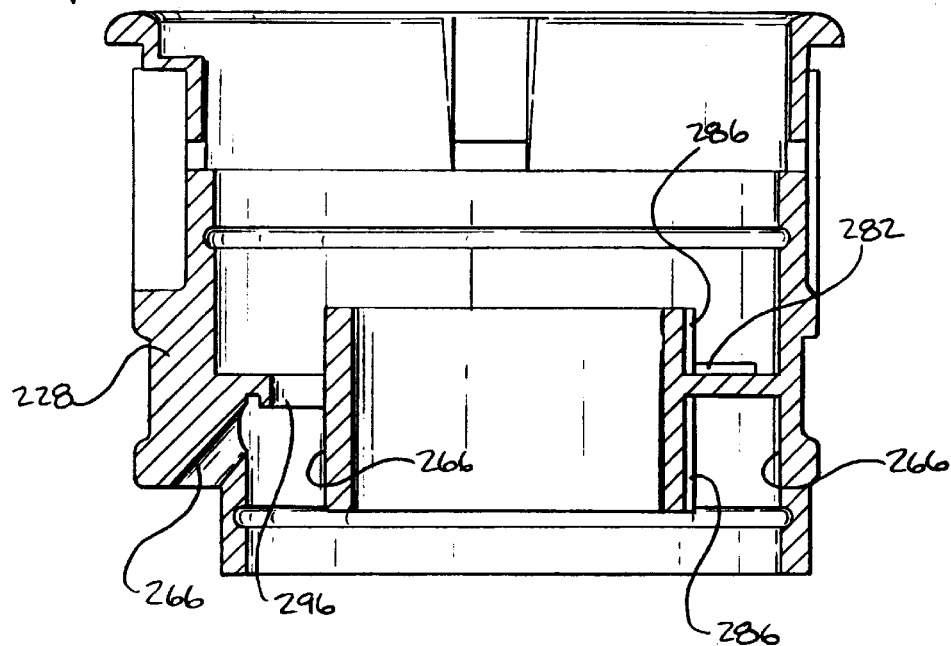
FIG. 16 is a cross-sectional side view of a housing taken from the alternative embodiment of FIG. 13.
Figure 17:
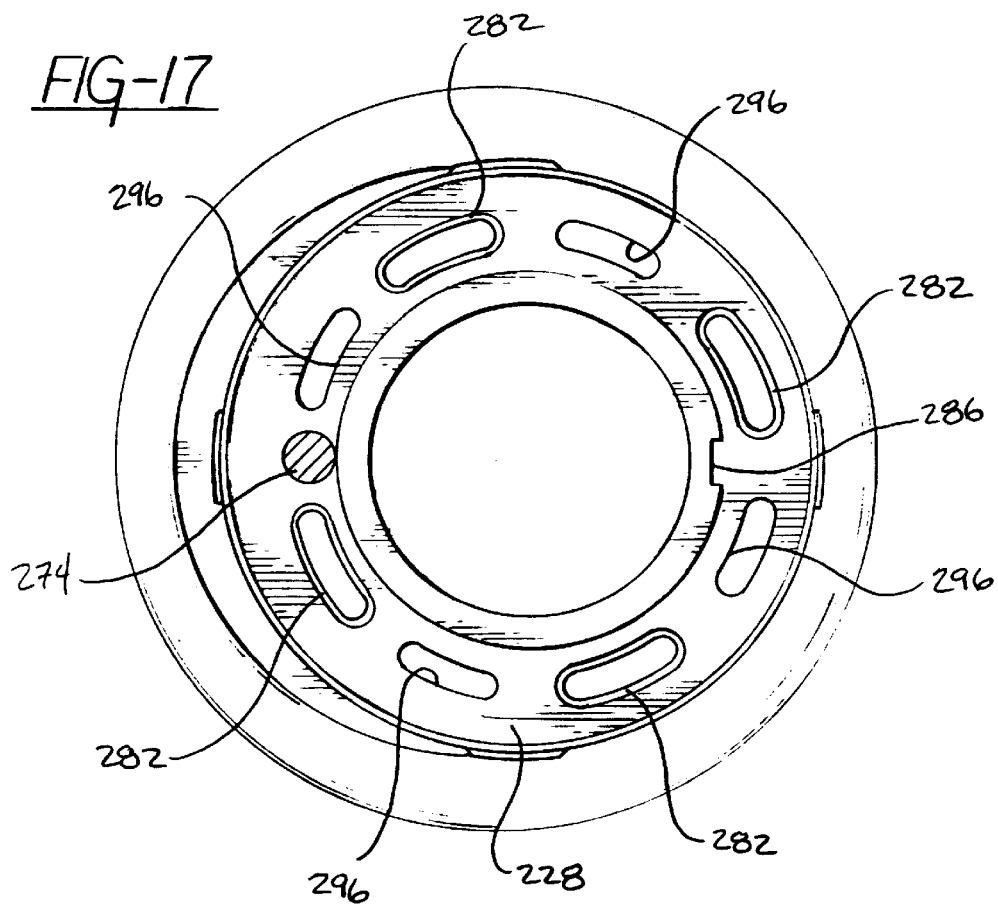
FIG. 17 is a top view taken along line 17—17 of FIG. 13.
Figure 18:
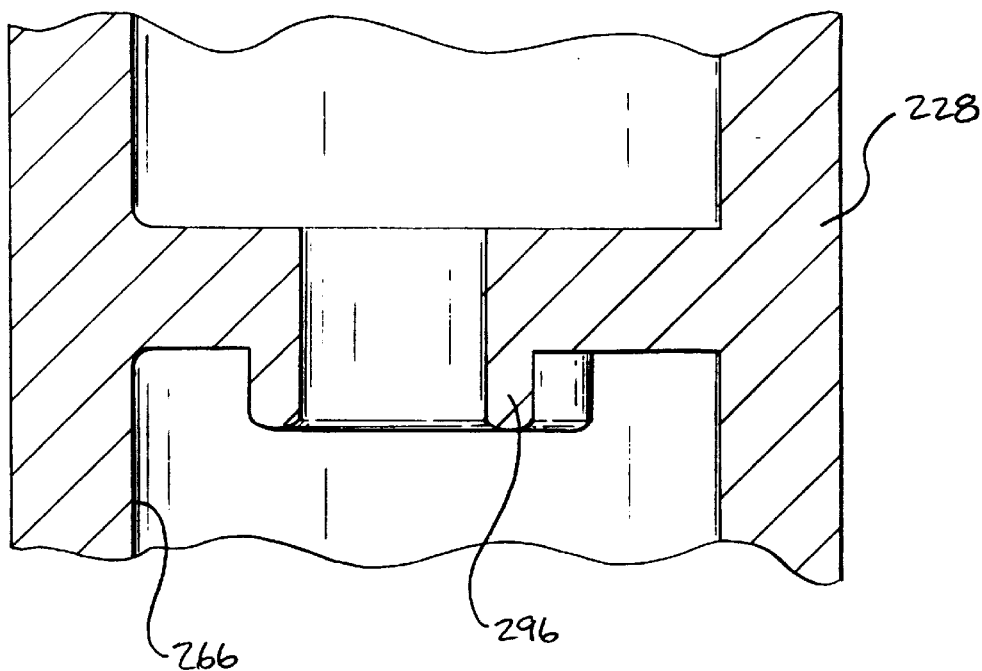
FIG. 18 is a detailed view of a vacuum opening taken from the alternative embodiment of FIG. 13.

As also shown in FIGS. 16, 17 and 18, the upper portion 228 of the housing 228, 230 includes an upwardly projecting pressure opening 282 for seating the valve body 238 and sealing the filler neck 224. The spring 292 continuously biases the pressure gasket 288 against the pressure opening 282 of the housing 228, 230.

Figure 19:
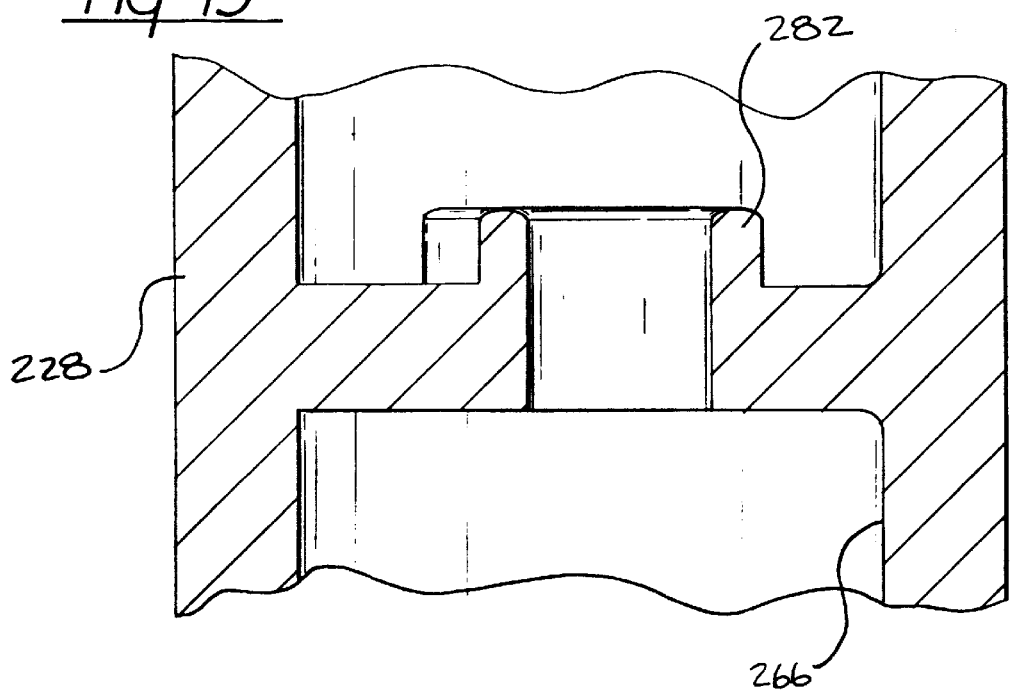
FIG. 19 is a detailed view of a pressure opening taken from the alternative embodiment of FIG. 13.

As shown in FIGS. 16, 17 and 19, the upper portion 228 of the housing 228, 230 includes a downwardly projecting vacuum opening 296. A second valve body 284 selectively engages the vacuum opening 296 to seal the filler neck 224. The second valve body 284 acts as a vacuum release valve in a similar fashion to the valve body 138 of the alternative embodiment of FIGS. 8–12. An annular vacuum spring 298 engages the second valve body 284 for biasing the second valve body 284 against the vacuum opening 296 of the housing 228, 230. The primary difference between the alternative embodiment of FIGS. 8–12 and this alternative embodiment is in the configuration and operation of the valve bodies 238, 284. A notch 286 is provided to guide the upward and downward movement of the valve bodies 238, 284.

There are preferably a number of pressure openings 282 and vacuum openings 296 disposed circumferentially within the upper portion 228. Even more preferably, there are four pressure openings 282 and four vacuum openings 296 disposed in an alternating fashion.

In accordance with the subject invention, pressure within the fuel tank is released during the insertion of the filling nozzle. The filling nozzle first engages and pivots the first flap 256. The cam 280 extending from the first flap 256 engages the post 274 of the valve body 238 to lift the plate 240 from engagement with the pressure opening 282. The ventilating of the filler neck 224 is specifically achieved by opening a fluid passageway between the chamber 266 and the atmosphere via the unsealing of the pressure gasket 288 from the pressure opening 282.

Many modifications and variations of the present invention are possible in light of the above teachings. It is, therefore, to be understood that within the scope of the appended claims the invention may be practiced otherwise than as specifically described.

What is claimed is:

1. A fuel refilling assembly for selectively receiving a filling nozzle to open and close a filler neck of a fuel tank, said assembly comprising;

a housing adapted for attachment to the filler neck to selectively receive the filling nozzle; and at least one sealing device movably mounted to said housing to move between seated and unseated positions for selectively equalizing any pressure within the filler neck;

said assembly characterized by an actuator movably mounted to said housing and selectively engaging said sealing device for responsively moving said sealing device from said seated position to said unseated position when the filling nozzle is partially received within the filler neck, thereby venting any pressurized fluid from the filler neck before the filling nozzle opens the filler neck.

2. An assembly as set forth in claim 1 wherein said actuator includes a first flap pivotally connected to said housing and positioned to selectively engage the filling nozzle.

3. An assembly as set forth in claim 2 further including a second flap pivotally connected to said housing and disposed to engage the filling nozzle after the filling nozzle engages the first flap.

4. An assembly as set forth in claim 3 further including a flap gasket mounted to a distal end of said housing and engaged by said second flap for sealing a portion of said housing from the filler neck of the fuel tank.

5. An assembly as set forth in claim 2 wherein said housing includes an upper portion and a lower portion.

6. An assembly as set forth in claim 5 wherein said sealing device is further defined as a valve body movably mounted to at least one of said upper and lower portions of said housing.

7. An assembly as set forth in claim 6 wherein said valve body includes a plate for seating against said housing.

8. An assembly as set forth in claim 7 further including a valve gasket mounted to said plate.

9. An assembly as set forth in claim 7 wherein said lower portion of said housing defines a vent passageway for providing fluid communication between said valve body and the fuel tank.

10. An assembly as set forth in claim 9 wherein said housing further defines a chamber disposed above said vent passageway for providing fluid communication between the fuel tank and said upper portion of said housing.

11. An assembly as set forth in claim 10 wherein said lower portion of said housing includes a sealing seat with said plate of said valve body engaging said seat when said valve body is in said seated position.

12. An assembly as set forth in claim 11 wherein said valve body further includes an upwardly extending frame having a cross member.

13. An assembly as set forth in claim 12 wherein said actuator includes a projecting finger engaging said cross member to responsively move said valve body from said seated position to said unseated position when the filling nozzle engages the first flap.

14. An assembly as set forth in claim 13 further including a retainer mounted to at least one of said upper and lower portions of said housing and disposed between said upper and lower portions within said chamber adjacent said valve body.

15. An assembly as set forth in claim 14 further including at least one biasing device mounted between said retainer and said valve body to continuously bias said valve body toward said seated position with said plate engaging said seat.

16. An assembly as set forth in claim 15 further including at least one guide extending from said valve body and at least one aperture formed within one of said upper and lower portions of said housing for receiving said guide to orient said valve body relative to said housing during said movement between said seated and unseated positions.

17. An assembly as set forth in claim 10 further including a funnel mounted to said upper portion of said housing and at least partially extending into said lower portion.

18. An assembly as set forth in claim 17 wherein said funnel includes a plurality of apertures for venting any fluid from said vent passageway and chamber.

19. An assembly as set forth in claim 10 wherein said actuator includes a cam selectively engaging said valve body for moving said valve body to said unseated position when the filling nozzle engages the first flap.

20. An assembly as set forth in claim 19 wherein said valve body includes a post selectively engaging said cam of said actuator.

21. An assembly as set forth in claim 20 further including a valve gasket mounted to said lower portion of said housing with said plate of said valve body selectively engaging said gasket to seal the filler neck, said cam of said actuator selectively engaging said post to disengage said plate from said gasket to vent the filler neck and fuel tank before the filling nozzle is fully inserted to open the filler neck.

22. An assembly as set forth in claim 21 further including a pair of springs engaging said plate for continuously biasing said plate toward said engagement with said gasket.

23. An assembly as set forth in claim 22 wherein said upper portion of said housing includes an upwardly projecting pressure opening.

24. An assembly as set forth in claim 23 further including a second valve body selectively engaging said pressure opening to seal the filler neck.

25. An assembly as set forth in claim 24 further including an annular pressure spring engaging said second valve body for biasing said second valve body against said pressure opening of said housing.

26. An assembly as set forth in claim 20 wherein said upper portion of said housing includes an upwardly projecting pressure opening for seating said valve body and sealing the filler neck.

27. An assembly as set forth in claim 26 wherein said upper portion of said housing includes a downwardly projecting vacuum opening.

28. An assembly as set forth in claim 27 further including a second valve body selectively engaging said vacuum opening to seal the filler neck.

29. An assembly as set forth in claim 28 further including an annular vacuum spring engaging said second valve body for biasing said second valve body against said vacuum opening of said housing.

* * * * *